United States Patent
Nivlet et al.

(10) Patent No.: US 12,085,685 B2
(45) Date of Patent: Sep. 10, 2024

(54) SYSTEMS AND METHODS FOR SEISMIC WELL TIE DOMAIN CONVERSION AND NEURAL NETWORK MODELING

(71) Applicant: Saudi Arabian Oil Company, Dhahran (SA)

(72) Inventors: Philippe Georges Christophe Nivlet, AlKhobar (SA); Robert James Smith, Dhahran (SA); Nasher Muqbel AlBinHassan, Dhahran (SA)

(73) Assignee: Saudi Arabian Oil Company, Dhahran (SA)

(*) Notice: Subject to any disclaimer, the term of this patent is extended or adjusted under 35 U.S.C. 154(b) by 0 days.

(21) Appl. No.: 17/498,276

(22) Filed: Oct. 11, 2021

(65) Prior Publication Data
US 2022/0137245 A1    May 5, 2022

Related U.S. Application Data

(60) Provisional application No. 63/109,007, filed on Nov. 3, 2020.

(51) Int. Cl.
    *G01V 1/28*        (2006.01)
    *G06N 3/084*     (2023.01)

(52) U.S. Cl.
    CPC ............ *G01V 1/282* (2013.01); *G06N 3/084* (2013.01); *G01V 2210/43* (2013.01)

(58) Field of Classification Search
    CPC ............ G01V 1/282; G01V 2210/43; G01V 2210/161; G01V 2210/48; G01V 1/32;
(Continued)

(56) References Cited

U.S. PATENT DOCUMENTS

| 7,525,874 B2 * | 4/2009 | Robinson ................. G01V 1/32 367/54 |
| 10,991,078 B2 | 4/2021 | Hakimuddin |

(Continued)

FOREIGN PATENT DOCUMENTS

| CN | 104500017 A | 4/2015 |
| WO | 2021046576 A1 | 3/2021 |
| WO | 2021062422 A1 | 4/2021 |

OTHER PUBLICATIONS

R. White and R. Simm, "Tutorial—Good Practice in Well Ties", First Break Oct. 2003, earthdoc.org (Year: 2003).*

(Continued)

*Primary Examiner* — Douglas Kay
(74) *Attorney, Agent, or Firm* — Dinsmore & Shohl LLP

(57) ABSTRACT

Systems and methods are provided for seismic well tie domain conversion. In one embodiment, a process is provided to integrate well and seismic data for reservoir characterization. System configurations and processes described herein use neural networks to predict sonic well logs in the two way time (TWT) domain from measured well logs in depth, rather than predicting drift function. Embodiments are also directed to systems for reservoir characterization. Domain conversion of data includes receiving input data, preprocessing the data, and training a model to determine a length of an output sequence. The method also includes training the model for conversion of data based on at least one neural network. A sequence length prediction may be output as part of training and to perform modeling/prediction operations. The method also includes outputting the sequence of converted data in a TWT domain and a length of the sequence.

20 Claims, 9 Drawing Sheets

(58) Field of Classification Search
CPC ........ G06N 3/084; G06N 3/044; G06N 3/045; G06N 3/082; G06N 5/01; G06N 7/01
See application file for complete search history.

(56) References Cited

U.S. PATENT DOCUMENTS

| | | | |
|---|---|---|---|
| 2006/0256657 A1* | 11/2006 | Robinson | G01V 1/40 367/38 |
| 2016/0341835 A1* | 11/2016 | Guillaume | G01V 1/282 |
| 2019/0096135 A1* | 3/2019 | Dal Mutto | G06F 18/24765 |
| 2019/0108396 A1* | 4/2019 | Dal Mutto | G06V 20/52 |
| 2019/0383965 A1 | 12/2019 | Salman et al. | |
| 2021/0018642 A1* | 1/2021 | Shuler | G01V 1/50 |
| 2021/0326721 A1* | 10/2021 | Zhang | G06N 5/04 |
| 2022/0129788 A1* | 4/2022 | Zhang | G01V 1/50 |

OTHER PUBLICATIONS

Y. Singh, "Deterministic inversion of seismic data in the depth domain", The Leading Edge, May 2012, pp. 538-545 (Year: 2012).*
P. Nivlet at el, "Automated well-to-seismic tie using deep neural networks", SEG Technical. Program Expanded Abstracts 2020, Sep. 30, 2020 (Sep. 30, 2020), pp. 2156-2160, XPOSSSS0760, DOI: 10.1190/segam.2020-3422495.1 (Year: 2020).*
Bai et al. "An Empirical Evaluation of Generic Convolutional and Recurrent Networks for Sequence Modeling" arXiv:1803.01271v2 [cs.LG] Apr. 19, 2018, 14 pgs.
Bergstra et al. "Algorithms for Hyper-Parmeter Optimization" 2011, 9 pgs.
Box et al. "Reconciling sonic logs with check-shot surveys: Stretching synthetic seismograms" The Leading Edge, Jun. 2003, 6 pgs.
Cho et al. "Learning Phrase Representations using RNN Encoder-Decoder for Statistical Machine Translation" arXiv:1406.1078v3 [cs.CL] Sep. 3, 2014, 15 pgs.
Cui et al. "Drift time estimation by dynamic time warping" http://dx.doi.org/10.1190/segam2015-5802864.1, 2015, 5 pgs.
Herrera et al. "Automated Seismic-to-well Ties?" Copenhagen, 2012, 5 pgs.
Hochreiter et al. "Long Short-term Memory" Neural Computation 9(8):1735-1780, 1997, 33 pgs.
Kingma et al. "Adam: A Method for Stochastic Optimization" arXiv:1412.6980v8 [cs.LG] Jul. 23, 2015, 15 pgs.
Nivlet et al. "Automated well-to-seismic ti using deep neural networks" https://doi.org/10.1190/segam2020-3422495.1, Abstract Only, 2020, 2 pgs.
Zhang et al. "Accelerate Well Correlation with Deep Learning" Search and Discovery Article #42429 (2019), 8 pgs.
Notification of Transmittal of the International Search Report and the Written Opinion of the International Searching Authority, or the Declaration dated Jan. 27, 2022 pertaining to International application No. PCT/US2021/056593 filed Oct. 26, 2021, pp. 1-16.
Nivlet, Philippe et al "Automated well-to-seismic tie using deep neural networks", SEG Technical Program Expanded Abstracts 2020, Sep. 30, 2020, pp. 2156-2160.
Herrera, Roberto et al "Automatic approaches for seismic to well tying", Interpretation, vol. 2, No. 2, Apr. 10, 2014, pp. SD9-SD17.

* cited by examiner

SYSTEMS AND METHODS FOR SEISMIC WELL TIE DOMAIN CONVERSION AND NEURAL NETWORK MODELING

CROSS REFERENCE TO RELATED APPLICATIONS

This application claims the benefit of U.S. Provisional application Ser. No. 63/109,007 filed Nov. 3, 2020.

BACKGROUND

Successful oil and gas exploration depends on the proper characterization of reservoir formations in order to identify sweet spots where hydrocarbons can be found and produced. It also requires the identification of potential hazards linked with production (e.g., drilling risk in geological formations, etc.). Existing approaches include integrating data from previously drilled wells and geophysical data, such as seismic data. These approaches are sometimes referred to as well-ties or tying wells. Integration of different data sources for tying wells is not straightforward for various reasons including data uncertainty, resolution differences, and data sources characterizing different quantities.

One existing approach for integrating data uses Vertical Seismic Profiling (VSP), or Check-Shot (CS) data, to provide direct measures of the conversion law at well locations. Unfortunately, this special type of data is not recorded for the majority of drilled wells. Another approach is to use a sonic log to measure acoustic wave transit times into the subsurface formations. This method can be correct locally, but fails in general with conversion of thick intervals. The failure may be largely due to dispersion effect where propagation velocity is dependent on the measurement frequency, and to a large frequency gap between seismic (10-100 Hz) and well log data (1-10 kHz).

There exists a need for improved methods for seismic well ties and for domain conversion of data.

SUMMARY

Embodiments of the present disclosure are directed to systems and methods for seismic well tie domain conversion and neural networks.

In accordance with embodiments of the present disclosure, a system is provided for seismic well tie domain conversion. The system includes one or more processors and a non-transitory computer-readable memory storing instructions that, when executed by the one or more processors, causes the one or more processors to receive input data for a field region, the input data including depth domain data and time domain data for at least one well in the field region, preprocess the input data to generate training data for the field region, and train a well tie model to determine a length of an output sequence using the training data, wherein the tie model is a neural network configured to determine a length of an output in a time domain for well data received in a depth domain. The one or more processors train the well tie model to convert well data using the neural network, wherein the model is trained to convert a sequence of sonic log data in a depth domain to a sequence in a time domain, transform input data in the depth domain to the time domain using the well tie model, wherein transforming is performed using the well tie model and determined length of output sequence, and output the transformed data.

According to embodiments, the input data includes at least one seismic wave trace in a depth domain and at least one time-depth curve.

According to embodiments, the one or more processors preprocess the input data by performing a data and quality control estimation to validate well data for the field region, characterizing the well data for at least one of training, validation and testing, performing one or more operations for normalizing the well data, performing one or more operations for segmentation of the well data, and performing one or more operations for forming batches of data in the depth domain.

According to embodiments, the one or more processors train the well tie model to determine an output length sequence includes selection of at least one hyper-parameter, generating a vector of output sequences in a time domain for a batch of data and modifying weights of the well tie model using a back-propagation algorithm to reduce error relative to expected output for the batch of data.

According to embodiments, the one or more processors train the well tie model to convert well data includes training for conversion of sonic log data in a depth sequence to a two way time sequence using at least one of a Long-Short Term Memory (LSTM) neural network and a temporal convolutional network (TCN).

According to embodiments, the one or more processors transform input data to generates an estimate of a sonic trace in two-way-time.

According to embodiments, the one or more processors transform input data using a time-depth curve and a sonic drift determined from the input data for the field region.

According to embodiments, the one or more processors transform input data by converting an input sequence of a well to an output sequence with a defined length.

According to embodiments, the one or more processors are further configured to realign sequences in two-way-time by estimating a time-lag relative to the sequences and resampling the sequences following realignment to a common grid for output as a set of values in two-way-time.

In accordance with other embodiments, methodology is provided for seismic well tie domain conversion. The method includes receiving, by one or more well tie processors, input data for a field region, the input data including depth domain data and time domain data for at least one well in the field region, preprocessing, using the one or more well tie processors, the input data to generate training data for the field region, training, using the one or more well tie processors, a well tie model to determine a length of an output sequence using the training data, wherein the well tie model is a neural network configured to determine a length of an output in a time domain for well data received in a depth domain, and training, using the one or more well tie processors, the well tie model to convert well data using the neural network, wherein the well tie model is trained to convert a sequence of sonic log data in a depth domain to a sequence in a time domain. The method also includes transforming, using the one or more well tie processors, input data in the depth domain to the time domain using the well tie model, wherein transforming is performed using the well tie model and determined length of output sequence, and outputting, using the one or more well tie processors, the transformed data.

According to embodiments, the input data includes at least one seismic wave trace in a depth domain and at least one time-depth curve.

According to embodiments, the preprocessing includes performing a data and quality control estimation to validate well data for the field region, characterizing the well data for at least one of training, validation and testing, performing one or more operations for normalizing the well data, performing one or more operations for segmentation of the well data, and performing one or more operations for forming batches of data in the depth domain.

According to embodiments, training the well tie model to determine an output length sequence includes selection of at least one hyper-parameter, generating a vector of output sequences in a time domain for a batch of data and modifying weights of the well tie model using a back-propagation algorithm to reduce error relative to expected output for the batch of data.

According to embodiments, training the well tie model to convert well data includes training for conversion of sonic log data in a depth sequence to a two way time sequence using at least one of a Long-Short Term Memory (LSTM) neural network and a temporal convolutional network (TCN).

According to embodiments, the transformation generates an estimate of a sonic trace in two-way-time.

According to embodiments, the transformation uses a time-depth curve and a sonic drift determined from the input data for the field region.

According to embodiments, the transformation includes converting an input sequence of a well to an output sequence with a defined length.

According to embodiments, the method also includes realigning sequences in two-way-time by estimating a time-lag relative to the sequences and resampling the sequences following realignment to a common grid for output as a set of values in two-way-time.

In accordance with other embodiments, methodology is provided for seismic well tie domain conversion including receiving, by one or more well tie processors, input data for a well in a field region, the input data including a sonic trace for the well as depth domain data, preprocessing, using one or more well tie processors, the input data to determine a length of output sequence, and transforming, using the one or more well tie processors, input data in the depth domain to a time domain using a well tie model. The well tie model is a neural network configured to determine a length of an output in a time domain for well data received in a depth domain, and wherein the well tie model is trained to convert a sequence of sonic log data in a depth domain to a sequence in a time domain using the neural network. The method also includes outputting, using the one or more well tie processors, the transformed data.

According to embodiments, transforming includes converting an input sequence of a well to an output sequence with a defined length, and wherein transforming also includes realigning sequences in two-way-time by estimating a time-lag relative to the sequences and resampling the sequences following realignment to a common grid for output as a set of values in two-way-time.

It is to be understood that both the foregoing general description and the following detailed description present embodiments that are intended to provide an overview or framework for understanding the nature and character of the claims. The accompanying drawings are included to provide a further understanding of the disclosure, and are incorporated into and constitute a part of this specification. The drawings illustrate various embodiments and together with the description serve to explain the principles and operation.

DETAILED DESCRIPTION OF THE DISCLOSURE

Figure 1:
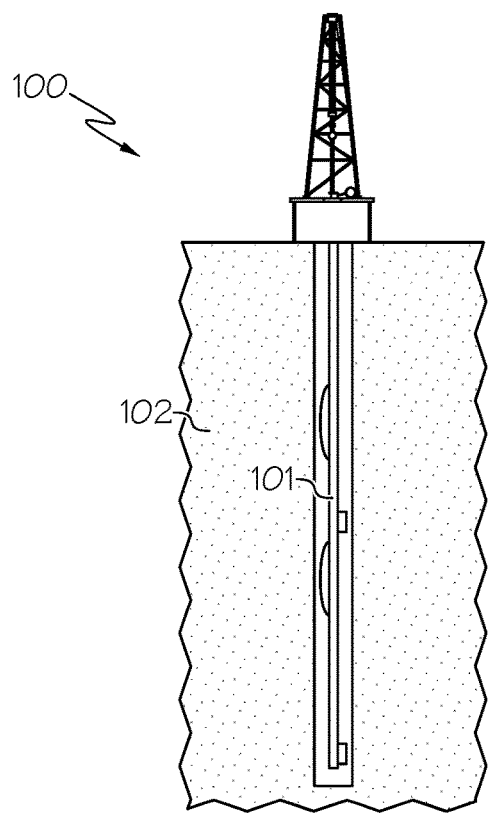
FIG. 1 is a graphical illustration of well data conversion.
Figure 1:
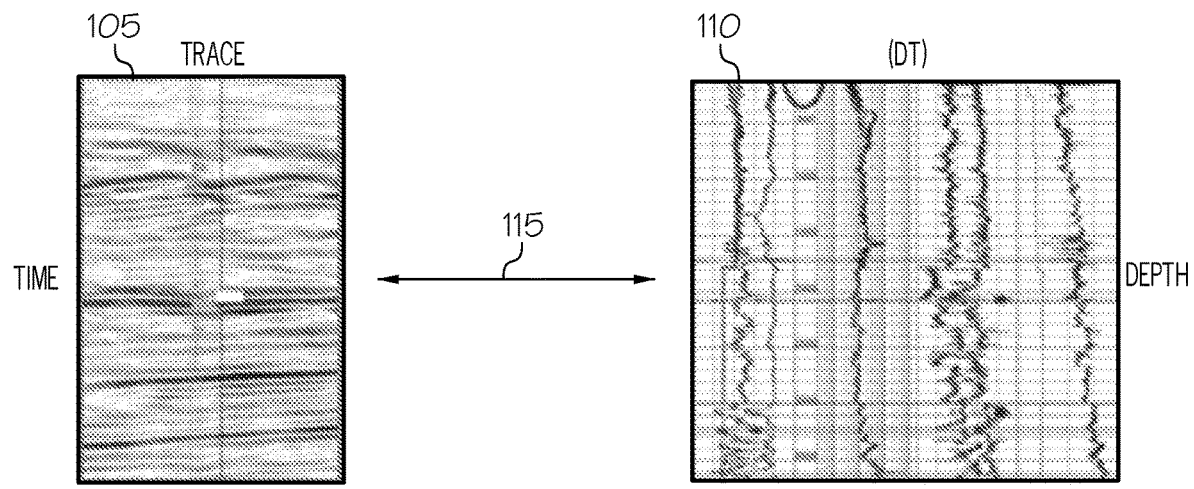

One aspect of the present disclosure is directed to processing subsurface data. Systems and methods are described for conversion of subsurface data, particularly well logs, between different vertical domains. In one embodiment, a process is provided for automated conversion of data from a depth domain to a time domain. According to another embodiment, a conversion process is provided for data from a time domain to depth domain. Conversion of subsurface data according to embodiments described herein can include using a deep neural network, generating of models for transformations, and operations to learn how to stretch well log data from a depth domain to a time domain, such as Two-Way-Time (TWT).

Processes herein may include operations using a neural network and training operations to process data. The training process and data modeling can be applied to wells with existing Vertical Seismic Profiling (VSP) or Check-Shot (CS) data. Systems and processes described herein can use a trained network on additional wells to automatically stretch well logs to the TWT domain. Processes described herein can include preprocessing and post-processing operations in addition to training operations, and application of a deep neural networks for characterization of a reservoir formation.

According to embodiments, systems and methods are configured for seismic well tie domain conversion and neural networks. By way of example, a method is provided for domain conversion of data. The method includes receiving input data, preprocessing the data, and training a model to determine a length of an output sequence. The method also includes training the model for conversion of data using at least one neural network. A sequence length prediction may be output as part of training and to perform modeling and/or prediction operations. The method also includes outputting sequence length in a Two-Way-Time (TWT) domain. The method also includes transformation of data. A modeling transformation operation is performed based on training of the neural network for domain conversion.

Embodiments are also directed to conversion of well data. According to embodiments, a method is provided that includes performing data normalization for input data, such as the well log in depth. The method also includes operations for data preparation, predicting an output TWT length for each sequence, and converting an input sequence to the output sequence with a defined length. The method also includes realigning different sequences in the TWT domain by estimating an optimal time-lag from one sequence to the next. The method can include output for any given TWT value.

Another embodiment is directed to a system for domain conversion and reservoir characterization. The system includes a device having at least one processor, such as a well tie processor, and memory. The device and one or more processors may be configured to receive data in a first depth domain and convert the data to a TWT domain. The system may perform one or more processes and methods described herein.

One or more embodiments are directed to characterization of reservoir formations. By way of example, processes are described herein for reservoir characterization that allow for exploration and/or characterization of a field in production. In some situations, seismic data may be the only source of data covering geological formations outside of well positions for a region or site. Embodiments are provided to integrate at least two types of data for more accurate reservoir characterization using project data for a same vertical domain. By way of example, well data may be sampled in depth. The seismic data has a vertical dimension that is a Two-Way-Time (TWT) representing the time a vertical wave take to propagate vertically from a reference point to any subsurface point and back to the reference point. Embodiments may also be directed to integrating data using a calibration between seismic amplitudes and well log properties.

A depth-time conversion may be necessary for at least one of integrating seismic data into a reservoir model for reservoir characterization, reservoir monitoring, and even reservoir model update and geo-steering. The conversion may be applied when data, such as Vertical Seismic Profile (VSP) or Check-Shots (CS), are recorded at the well position. For the vast majority of drilled wells however, such information is not available and the conversion may be prone to error. The present disclosure provides operations and processes to learn automatically at least one conversion operation from two or more wells where VSP/CS data is available through deep learning methods. According to some embodiments, input to a learning process can include a well log (e.g., sonic log) recorded in depth, with output for the same well logs in the TWT domain. Two types of architecture that work particularly well for this type of issue are Long-Short Term Memory (LSTM), a type of recurrent neural network, and temporal convolutional networks (TCN). Embodiments include training and tuning a model, such as a well tie model, and applying the well tie model to convert sonic logs for all the available wells in the field to the TWT domain. Systems and processes described herein may be configured to handle one-dimensional (1D) warping of data between other domains (for instance P-wave time and S-wave time). The disclosure also describes testing of various sequence-to-sequence modelling networks including LSTM.

Referring now to FIG. 1, a graphical illustration is provided of well data conversion for a reservoir region 100. Reservoir region 100 is shown including well 101 in field 102. Seismic trace 105 represents subsurface data in the time domain collected for a field region, such as field 102. Well data 110 represents data in a depth domain for a well, such as well 101. Processes are described herein, and shown as conversion 115, for data, such as well data 110 in a depth domain, to be converted to data in a time domain. As such, seismic trace 105 and well data 110 may be integrated. Processes are provided for conversion of data relative to two different domains. Processes and configurations described herein may also be configured for conversion 115 of data from a time domain to a depth domain.

Seismic data, such as seismic trace 105, may be used to offer data in subsurface regions that have not been yet drilled. Seismic data can also provide three-dimensional (3D) coverage of reservoirs. However, seismic data can suffer from a number of characteristics that prevent integration with well data 110 directly. First, the vertical resolution of seismic data is low, on the order of tens of meters, compared to centimeters (cm) for well data. Second, the vertical dimension for seismic data is not a true depth, but a vertical TWT of wave propagation. Thus, prior to any calibration, well data must be converted from depth to the TWT domain (or vice versa by converting seismic data from TWT to depth domain) according to embodiments. Third, amplitude is recorded for a seismic trace, which is sensible to some property contrast. However, inversion of the data is required to generate a property model. Systems and processes described herein provide a solution for depth-to-time conversion and amplitude calibration.

Figure 2:
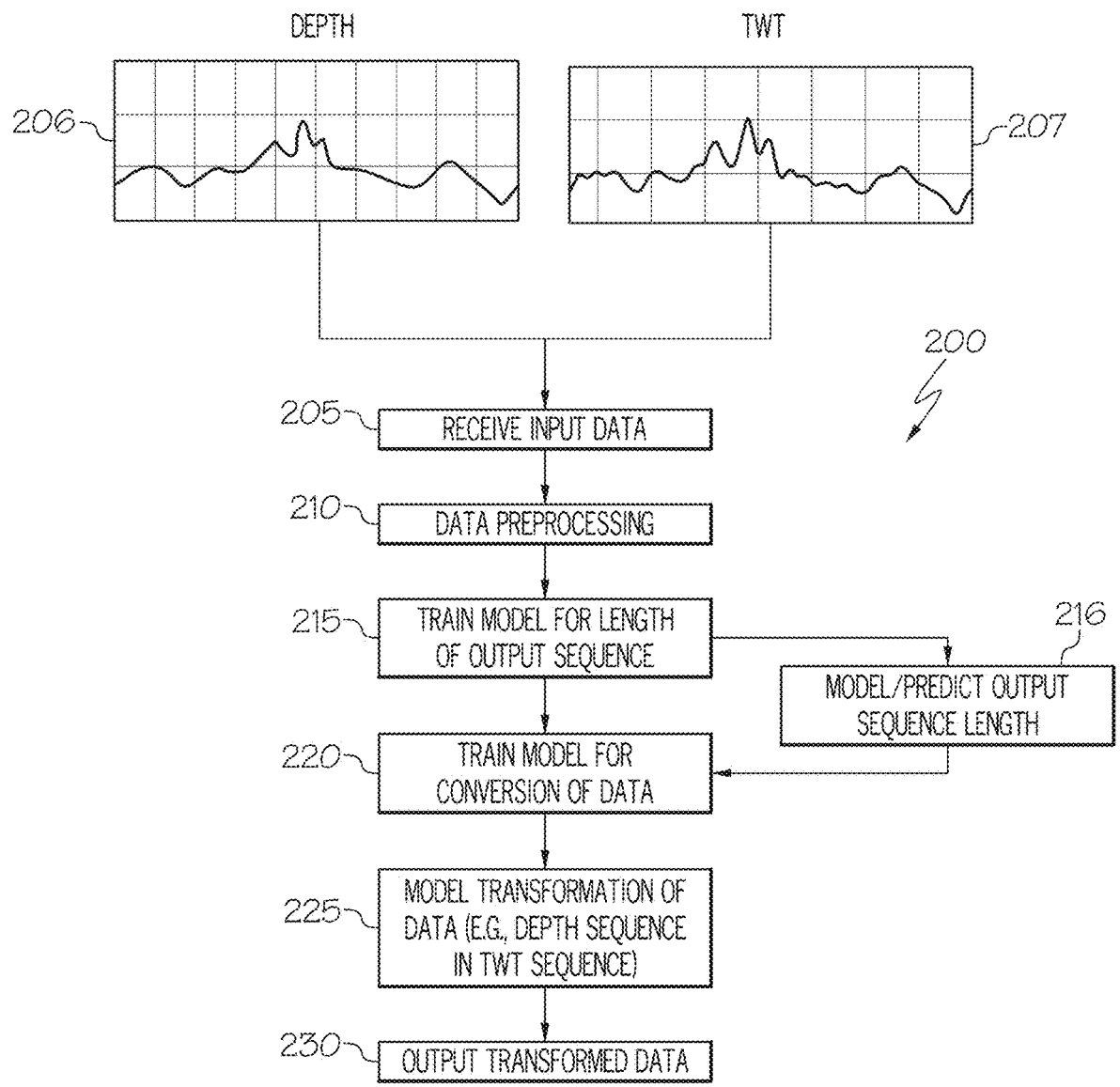
FIG. 2 illustrates an example training process.

FIG. 2 illustrates an example process 200 for domain conversion of data. According to embodiments, process 200 may be performed for seismic well tie conversion using a neural network. Process 200 may be performed to process seismic data to characterize reservoir formations or reservoir region 100. Process 200 may be performed by device including one or more processors, such as a well tie processor, as discussed below with reference to FIG. 9.

Process 200 may be initiated by receiving input data at block 205. Input data received at block 205 can include data 206 in the depth domain and data 207 in time domain (e.g., TWT data). Data 206 may relate to available time-depth curves. Data 207 may relate to depth—TWT curves. Data received at block 205 may also include at least one seismic wave trace in a depth domain and at least one time-depth curve. Data received at block 205 may also include extracted data for available wells with CS/VSP data. According to some embodiments, data received at block 205 can include at least one of (1) available time-depth curves derived from CS/VSP data; (2) well logs with at least a compressional sonic log (DTC) in depth with associated well trajectories (X, Y, Z); and (3) the X, Y and Depth coordinates of a regional marker from well data. The input data received at block 205 may be used to train a neural network (e.g., deep learning network) and generate at least one model, such as a well tie model, for domain conversion of data.

Process 200 includes preprocessing the received data at block 210, training a model (e.g., well tie model) to determine a length of an output sequence at block 215, and training the model for conversion of data at block 220. Data processing at block 210 may include preprocessing of the data received at block 205 to prepare the data for training of a computing device. Preprocessing at block 210 is described in more detail in FIG. 3. As described below, a sequence length prediction may be output as part of training at block 215. The sequence length determined at block 215 may be used to perform modeling/prediction operations at block 216.

At block 215, one or more operations are performed to train a model to predict the length of an output sequence. By way of example, training is performed by a neural network that learns the length of the output TWT sequences when it is fed with an input sequence in depth. In some embodiments, the neural network may use a Recurrent Neural Network (RNN) that is a gated neural network, such as a Long-Short-Term-Memory networks (LSTM) or a Gated Recurrent Units (GRU). Training a model at block 215 may include using a recurrent neural network architecture that can differ from case to case in terms of many hyper-parameters such as the number of LSTM/GRU cells, the number of units per cell and whether the network is mono- or bi-directional. A RNN may provide mapping of relationships between input and output data, and each RNN cell can output a feedback to itself, which is particularly useful to handle sequential data such as text, time series or more generally any spatial data. LSTM and GRU neural networks are types of RNN with gated mechanism allowing to better handle long-term dependencies within the sequences. Use of the RNN can be performed to learn the time-depth conversion based on the integrated sonic. Training models at block 215 may be performed to generate a neural network for modeling a reservoir region.

According to another embodiment, training at block 215 may use neural network using a temporal convolutional networks (TCN). Training a model at block 215 may include using architecture parameters including number of layers, number of filters per layer, convolution stride and filter size at each layer, and a dilation parameter which controls how fast the receptive field grows from one layer to another. TCNs are a family of convolutional architectures that can take an input sequence and output another sequence. As such, stacked convolutional layers are provided using dilated convolutions to enable the receptive field of the network to grow exponentially with the number of layers. Each convolutional layer can use a residual (or temporal) block which is a series of dilated convolutions, batch (or similar) normalization, non-linear activation function and dropout.

In order to extract relevant information from these networks, the output of the last LSTM/GRU/TNN layer is flattened and connected to one classical neuron. Training models at block 215 may use at least one of the following parameters: amount and type of regularization; format for initializing network weights and bias; type of activation functions; learning rate; and mini-batch size. According to one embodiment, training models at block 215 may include selection of one or more hyper-parameters, and use of the neural network to sequentially take a random mini-batch of data. The neural network can provide a corresponding vector of output TWT sequence lengths, and compare it to the expected vector of sequence lengths. The measure of discrepancy (also called loss) can be the mean absolute difference, or mean squared difference, even though other measures are possible. The neural network can then automatically modify internal weights using a back-propagation algorithm in order to decrease the measured discrepancy. According to one embodiment, process 200 may use an ADAM algorithm as mini-batch stochastic gradient descent algorithm with momentum. One epoch corresponds to the point where all the mini-batches have been used to update the model weights. The optimization continues one epoch after another until a convergence criterion, or until a maximum number of epochs is reached. One of the classical convergence criteria includes monitoring the loss on the validation set. In general, the validation loss starts by decreasing similarly to the training loss, until a point where the two curves diverge, with the validation loss starting to increase or reaching a plateau. This point is where overfitting starts and is where the training generally is stopped.

According to one embodiment, training models at block 215 may select an optimal set of hyper-parameters based on one or more strategies. According to one embodiment, a systematic exploration of all potential combinations of hyper-parameters, also referred to as grid search, may be performed. The grid search may be intractable with more than 3-4 parameters. According to another embodiment, a random exploration of all potential combinations of hyper-parameters, also referred to as random search, may be performed. The random search may be more flexible, but is not guaranteed to find the absolute best solution. A focused exploration of hyper-parameters may be performed, where the algorithm learns to recognize regions of the hyper-parameter space where the loss is more likely to be small and focuses on these regions. One example of such a technique is the Tree of Parzen Estimator method.

Based on an optimal set of hyper-parameters determined in block 215, a neural network may be retrained using the set of hyper-parameters. Training and validation loss show the quality of the network while the evaluation of the network on the test dataset allows an estimation of the generalization potential of the network. The output block 215 may be a calibrated network which takes as input a sequence of sonic log data in depth and predicts the length of the corresponding sequence in time.

Process 200 may include outputting a sequence length at block 216. Similar to block 215, the output of block 216 can include a sequence length, however the output is a TWT domain. Process 200 may include modelling/predicting output sequence length using the model at block 216 and modeling transformation of data at block 225. A modeling transformation operation is performed at block 225 for transformation of data based on training in block 215 and 220 and for domain conversion.

Figure 5:
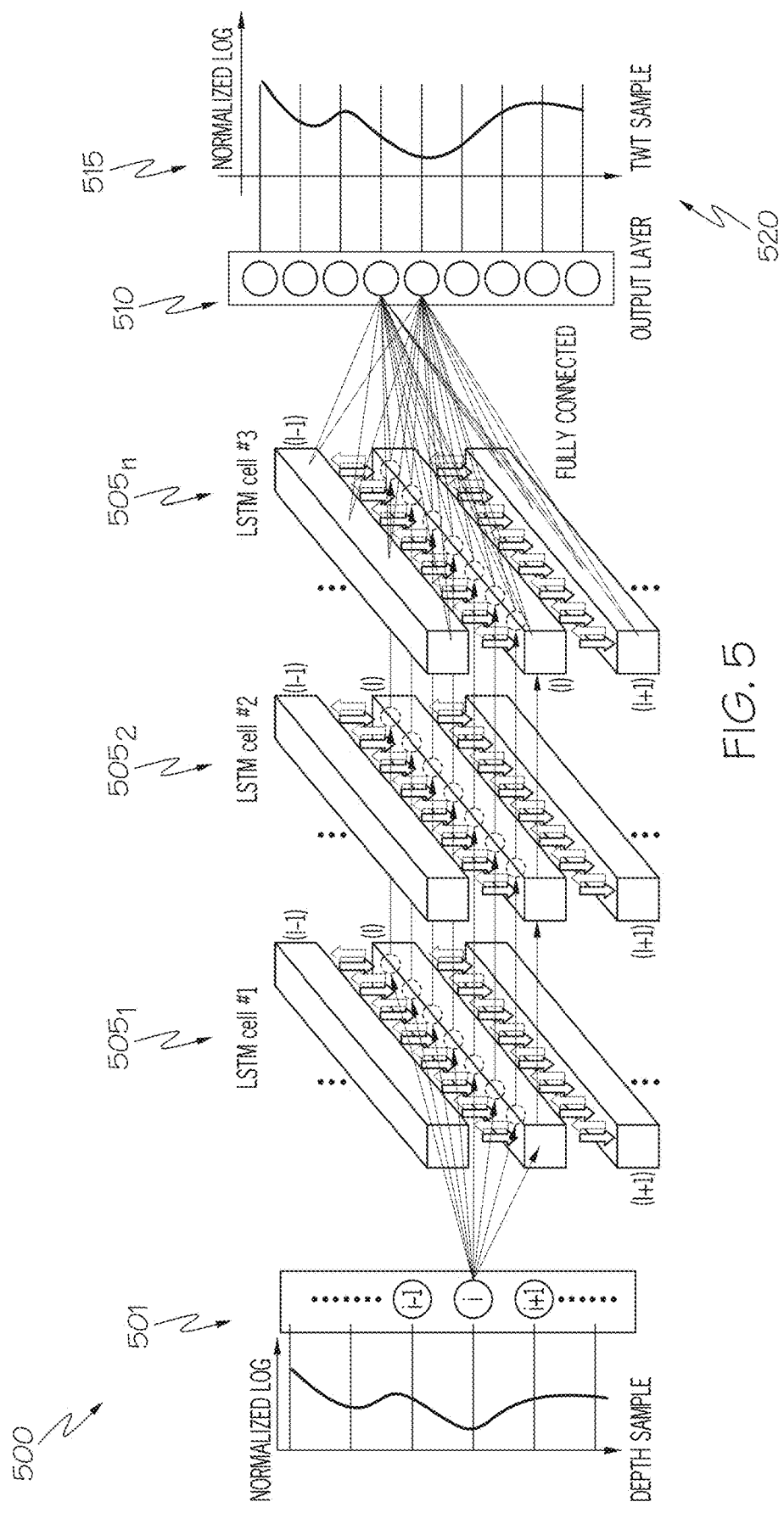
FIG. 5 illustrates an example representation of a neural network configuration.

At block 220, one or more operations are performed to train a model to convert a sequence of sonic log data in depth to a sequence in TWT. By way of example, training is performed by a neural network similar to block 215 with the exception that output of block 220 is a sequence in TWT. The output sequence length of block 215 may be used as an output mask when predicting the output TWT sequence at block 220, which allows a better performance of the overall networks. An example LSTM network to convert depth to TWT sequences is shown in FIG. 5.

At block 216, one or more operations are performed to predict real well log data. A process for predicting real well log data is described below with references FIGS. 6A-6B and 7. At block 225, process 200 models transformation of data, such as domain conversion of a depth sequence to a TWT sequence. Process 200 can automatically stretch a sonic log from depth to time. Once the two series are obtained, the time-depth curve and sonic drift may be extracted. From this sonic drift, an attenuation log may be estimated, which can be used for better seismic data modelling. Seismic attenuation is also a quantity that is sensitive to clay volume, pressure, saturation, and fracture, therefore it can be used for lithology and fluid discrimination. Embodiments of the disclosure learns to stretch a dataset from one domain to another, it could be used in general when stretching is relevant. Examples of situations can include warping of traces from one monitor seismic survey to a base seismic survey when acquiring 4D seismic data for field monitoring purpose, warping of traces from S-wave seismic data to P-wave seismic data with the objective of running a joint data inversion for improved reservoir characterization; and real time updating of a 3D geological modelling with well log data acquired during the drilling operation.

At block 230, transformed data, such as data transformed from a depth sequence to a TWT sequence, may be output. Process 200 may be used to transform data for one or more wells, such as well 101, in a field region, such as field 102.

Transformed data may be output at block 230 for one or more or storage in memory, display in a graphical user interface (GUI) and presentation on a device application for review and analysis of a field region.

Figure 8:
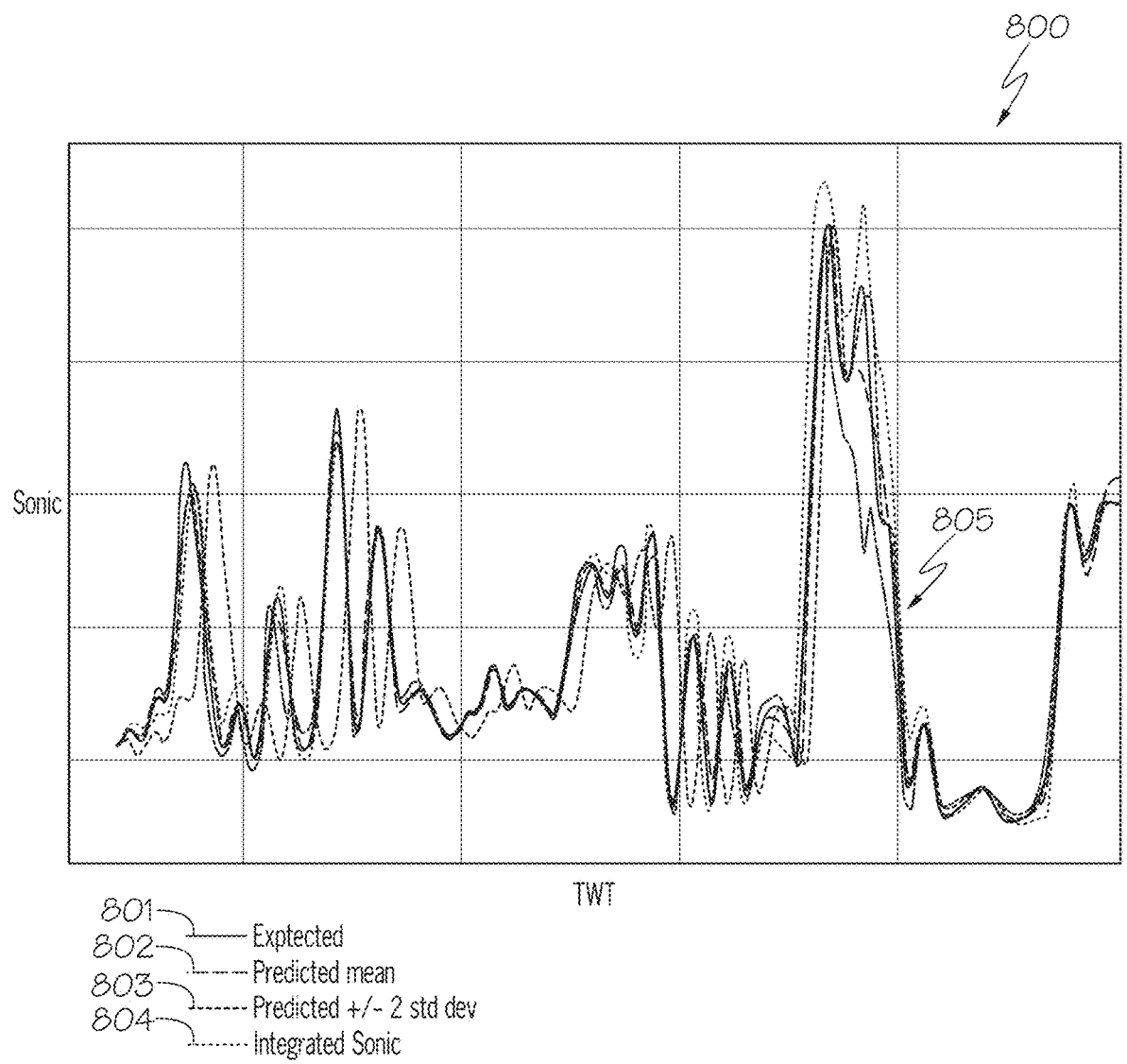
FIG. 8 is a graphical representation of experimental results.

Although process 200 is described as domain conversion from depth sequence to a TWT sequence, it should be appreciated that the principles of the disclosure may be utilized for conversion from a TWT sequence to a depth sequence. Exemplary results of such conversion processes are illustrated in FIG. 8.

Figure 3:
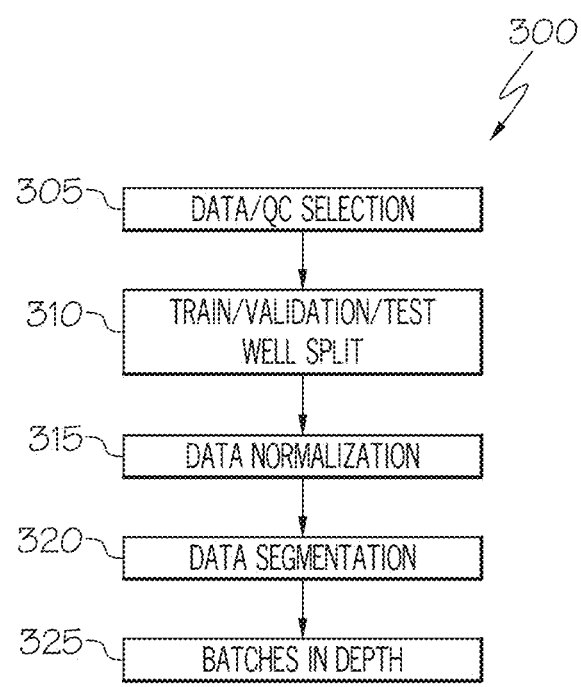
FIG. 3 illustrates an example process for data preprocessing.

FIG. 3 illustrates an example process 300 for data pre-processing (e.g., data preprocessing at block 210). Process 300 may be initiated by a data/quality control (QC) estimation at block 305 which can include one or more operations for sonic drift estimation and data quality control (QC). Operations at block 305 may validate well data for a field region. By way of example, a TWT curve may be generated first from a compressional sonic log by integrating the log as a function of depth. The well sonic drift curve is then estimated by subtracting the TWT curve measured by VSP/CS from the curve obtained by integrating the sonic log. This sonic drift curve SD(Z) has an arbitrary origin and may be set to 0 at a regional marker position. The following steps are then completed to reference the sonic drift curve:

- take the well pick (X, Y and Z) interpreted from well log data at the reference marker;
- extract at this position the sonic drift value: $SD(Z\_Ref)$; and
- determine the final corrected drift is $SD\_Corr(Z)=SD(Z)-SD(Z\_Ref)$.

Once sonic drift curves are obtained from each well, graphical representations of all the curves are combined together and at least some of the curves are identified as totally or partially anomalous. These anomalous curves or pieces of curves are then eliminated from the working data (see for example data falling in zones 426 on FIG. 4). Compared to prior processes, the calculated sonic drift may only be calculated for a QC purpose such that the VSP/CS data are not too noisy to be integrated in the workflow.

At block 310, operations include at least one of training, validation, and testing a well split. One or more operations are performed to identify wells for testing, validation and/or train set splitting. Once a cleaned data set is obtained, the validated wells are split into three independent subsets, named respectively training, validation and testing wells. The training wells are used for calibrating the neural networks; the validation set, to optimize internal neural network parameters referred to as network hyper-parameters and the test set verifies that the network can generalize to new wells.

At block 315, one or more operations for data normalization are performed. Neural networks work better when all input data have been normalized. According to one embodiment, well data is normalized at block 315 by calculating the minimum and maximum sonic values on all the validated logs and scale the sonic log into the range [0, 1] (e.g., normalization). Another option is standardization, where the mean and standard deviation values from all the sonic values are computed. The mean is subtracted from the values so that they are centered on zero and then divided by the standard deviations so that the normalized data has a standard deviation of one.

At block 320, operations for data segmentation are performed. There are two reasons for taking this sub-step. First, to ensure sufficient training data, and second to training the neural network on sequences with 100-1000's of depth samples would take a very long time. Alternatively, taking too short a sequence would give a very unstable network classification. According to some embodiments, 50 to 100 samples in length were determined to be a good compromise. At block 325, one or more operations for mini-batch forming (e.g., batch forming) the data into batches in the depth domain. After defining the individual depth sequence length, at least one of training, validation and test sets are generated by randomly extracting sequences of that length from the sonic log curve of either training, validation or test wells. Each sequence is then converted to TWT using the relevant part of VSP/CS data and the converted sequence is resampled to a constant TWT-step. Because the output TWT sequence length can vary, we store this length as one of our target variables. A target length may then be defined, which should be greater or equal to the length of any of the generated target sequences, and pad all the output TWT sequences to this length with 0s. Output of process 300 may include preprocessed data, generated by process 300, for training as described herein.

Figure 4:
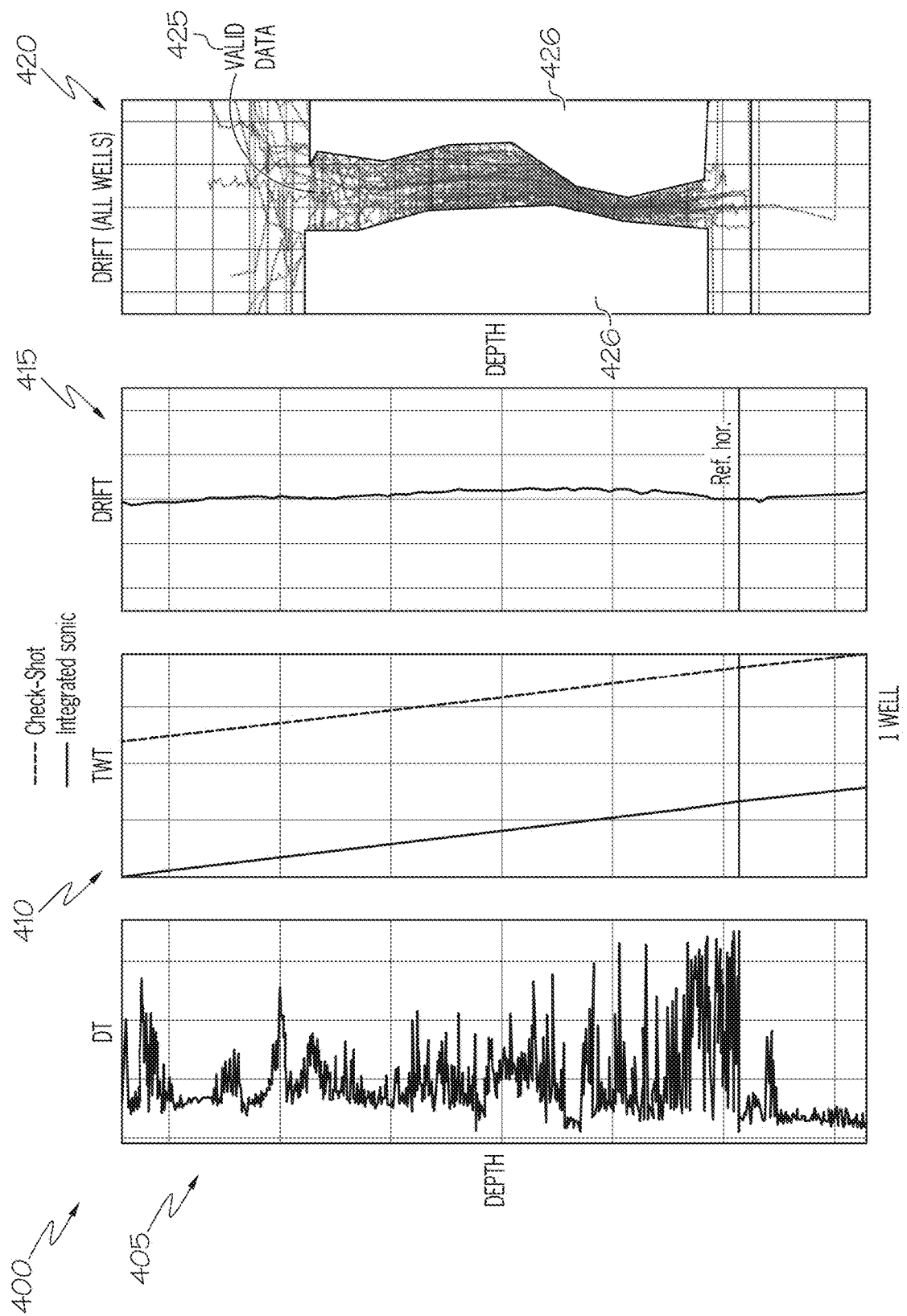
FIG. 4 illustrates a graphical representation of sonic drift computation.

FIG. 4 illustrates a graphical representation of sonic drift computation 400 and input data. According to one embodiment a sonic drift computation 400 is performed for data, and quality control and selection is shown as 420 for computed data. Input data (e.g., data for block 205) can include at least one of (1) available time-depth curves; (2) well logs with at least a compressional sonic log (DTC) in depth with associated well trajectories (X, Y, Z) 410; (3) the X, Y and Depth coordinates of a regional marker from well data; and (4) the Depth-TWT curves derived from CS/VSP data. Sonic drift computation may be based on well data include sonic drift data, TWT data 410 and drift 415. This data can be mapped for several wells to determine drift of all wells shown as 420. And validated data 425 may be determined. Anomalous curves or pieces of curves are then eliminated from the working data are represented generally by zones 426.

FIG. 4 illustrates a graphical representation of data from a field where 98 wells with VSP data are available. The density, shown as 405, and sonic logs for one of these wells, and the time depth curve in 410 calculated from integrated sonic or from the VSP. The sonic drift, shown as 415, was calculated by taking a reference marker, which is also a regional seismic marker, as a reference point where the drift is null. Drift curves estimated from all 98 wells are shown as 420. In general, drifts are positive as is expected from attenuation theory. While the curves seem to follow a similar vertical pattern, the intensity of the drift varies significantly from one well to another suggesting that the drift is not only influenced by stratigraphy but also by more local factors. These drift curves were cleaned to remove the inconsistent drift curves showing the largest oscillations. Following this process, 78 wells remained from which we used 46 for training using the process of FIG. 5. From the other 32 wells, half were used for validation and half for testing.

FIG. 5 illustrates an example representation of a neural network configuration. Neural network 500 may be employed by processes and configurations discussed herein and may be configured as a stacked bi-directional LSTM Neural Network to transform depth sequence to TWT sequence. FIG. 4 represents operations of a single LSTM cell. To account for more complex dependencies, cells are stacked in neural network 500. FIG. 5 illustrates stacked cells $505_{1-n}$ which includes an example of three stacked cells. The first cell $505_1$ takes depth sequence 501 as input and passes an output to sequence $505_2$. The last cell, cell $505_n$ is densely connected to the output layer 510 where the number of cells is representing the final length of the TWT sequence 515 and can output a TWT sample 520.

FIG. 5 also illustrates two additional features. First in each cell, the information is not only propagated through one channel, but in parallel through a number of units. Second, the flow of information is not only 1 way through time but two ways, meaning that this cells not only accounts for past information to predict cell state and output at a given time, but also of the future samples. This provides more stability to the prediction Neural network 500 may provide architecture for a LSTM based network for converting the sonic logs from depth to TWT. The input depth traces are fed into the first hidden layer of the first LSTM cell one depth sample at a time. Each neuron from this layer also receives a signal from the neuron above, corresponding to the memory context of the cell. The output of this first hidden layer is then used as input to the second hidden layer, and the process repeats itself until the last hidden layer. Then, the output generated by all the neurons in this first cell are concatenated and fed into the next LSTM cell. Finally, a dense layer connects the output of the last LSTM cell to a constant length output layer representing the output trace in the TWT domain. This type of network can work in both directions (known as a bidirectional LSTM, which can improve the accuracy of the predictions. Since not all time-converted traces have the same length, the network also has to learn the zero-padded values of this output layer, which it effectively does. A mean square error loss function was then minimized during the training process using the Adam optimization algorithm.

According to an exemplary embodiment, experiments were performed using neural network 500. To speed up the training phase, the network was trained on limited-size traces of 150 samples in depth (instead of the full 500 sample-long traces available). The network was trained using 60% of the traces, the remaining 40% being divided evenly between validation and test sets. The validation set was used to optimize the network hyper-parameters such as the learning rate, the number of cells and hidden layers per cell, the batch size and also additional regularization parameters to limit data over-fitting (e.g., drop-out proportion, recurrent weight drop proportion, weight regularization). Searching such a large hyper-parameter space manually would be very difficult. For this reason, a Bayesian hyper-parameter optimization was performed. Here, 50 training experiments were conducted using a Tree-Structured Parzen Estimator approach. This Bayesian approach modifies the sampling distribution as it gains more knowledge from the loss function behavior by favoring hyper-parameters which have potentially a lower loss. As a result, the validation loss function tends to decrease.

Regularization weights play a dominant role, and were kept to a very small value throughout the experiments. The second most important hyper-parameter is the learning rate. Increasing the complexity of the network globally improves the validation loss until a certain point where the network starts overfitting the data and loses its ability to generalize. The network performance is improved when bi-directional LSTMs are used. Other parameters like the type of weight initializer or the dropout rate had a secondary impact on the validation loss. In the experiment, the network was then retrained from scratch using the optimal set of hyper-parameters. The optimal network converges after 8 epochs and performs equally well on the training and validation set, which shows that the network has not overfit to the training data. Since the complete log for each well has more than 150 depth samples, the trace is converted from each pseudo well into a list of 150-long sample traces with a stride of 1. Prediction is made independently on each element of the list, keeping only the non-padded values. The predicted TWT trace is reconstructed by estimating the TWT necessary from one element to the next by cross-correlation. Globally the prediction is accurate, even though the network does not succeed in predicting accurately the highest frequencies. The trace could be used for building a depth conversion model.

Figure 6A:
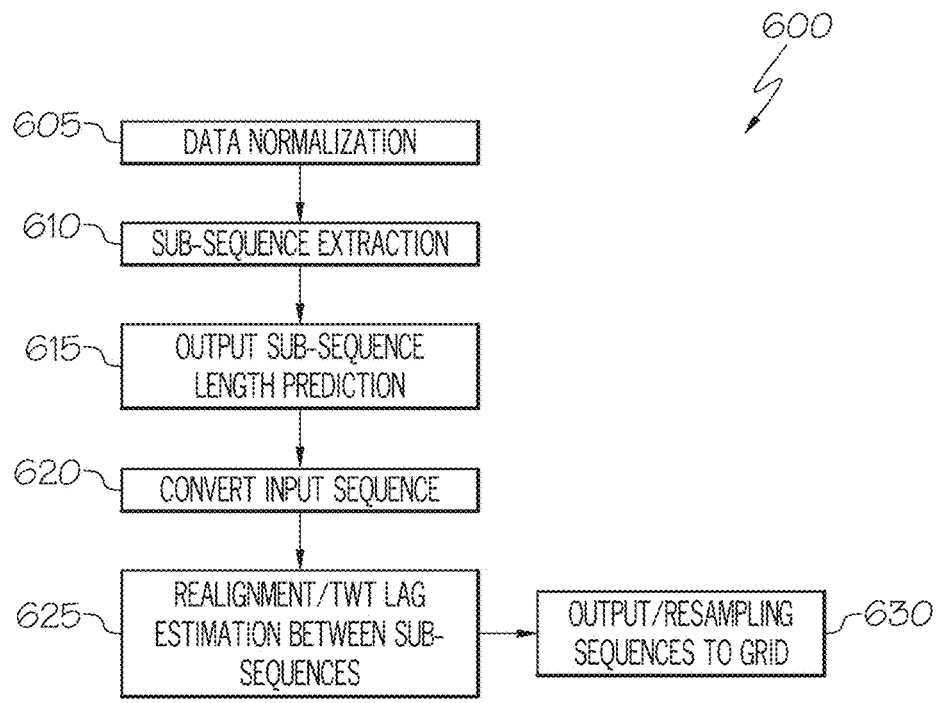
FIG. 6A illustrates a process for conversion of well data.
Figure 6B:
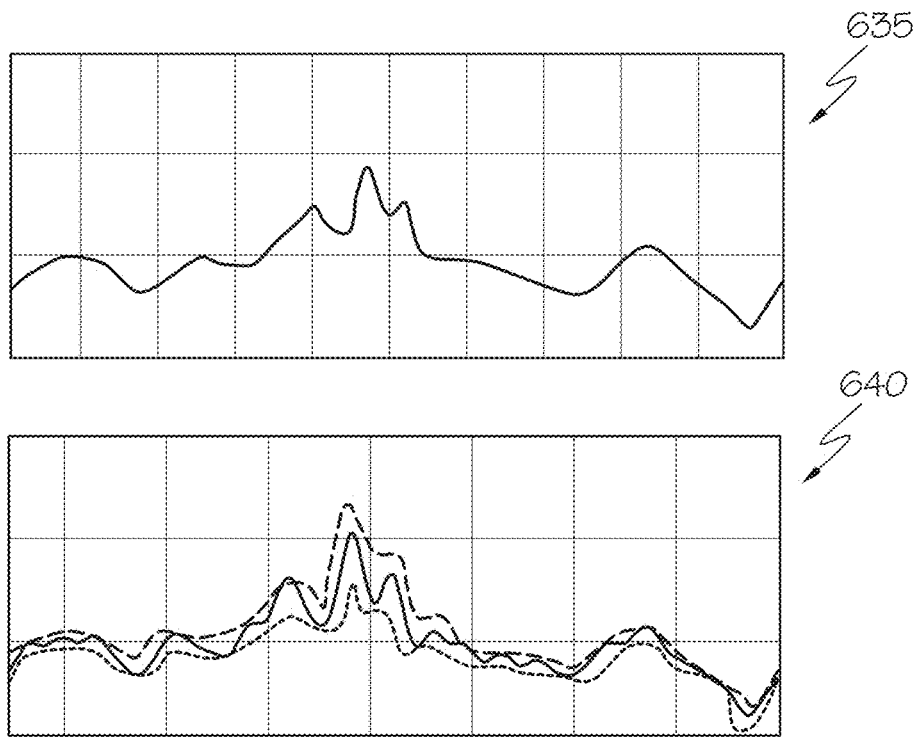
FIG. 6B is a graphical representation of well data for the process shown in FIG. 6A.

FIG. 6A illustrates process 600 for conversion of well data and FIG. 6B is a graphical representation of well data for process of FIG. 6A. Process 600 may be initiated by once a neural network is calibrated. The process may be performed for any well with an existing sonic log in depth. At block 605, process 600 performs data normalization for input data, such as the well log in depth. At block 610, one or more operations are performed for data preparation. These operations can include sequences with length dz in depth are extracted with a stride defined by a user. At block 615, the network (e.g., first network) predicts an output TWT length for each sequence. At block 620, the network (e.g., second network) converts the input sequence to the output sequence with length defined block 615. At block 625, the different sequences in TWT are realigned one with the other by estimating an optimal time-lag from one sequence to the next one. This can be done by time series cross-correlation for instance. At block 630, once all the sequences are realigned, they are resampled on a common grid and may be output. Output may be provided for any given TWT value that includes a set of values from which a central value (mean, median . . . ) and a measure of uncertainty (standard deviation, inter-quartile range . . . ) can be extracted. FIG. 6B illustrates an exemplary representation of input data 635 for well log in depth and output data 640 for a well long in TWT with an uncertainty representation. An example result of process 600 on a test well is shown in FIG. 8.

Figure 7:
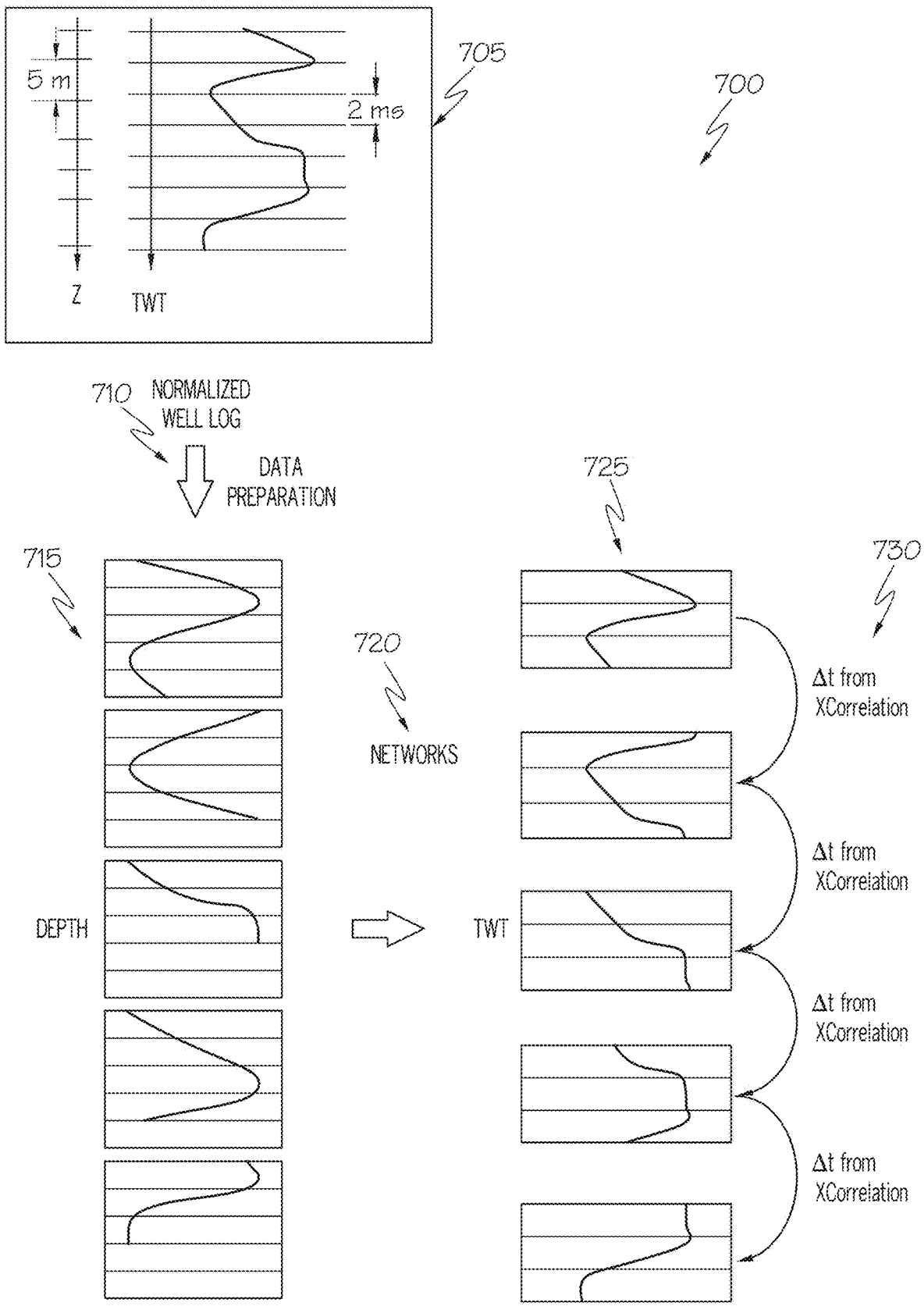
FIG. 7 illustrates a process for conversion of well data.

FIG. 7 illustrates a graphical representation of a process for conversion of well data. Process 700 may include operations similar to FIG. 6. Process 700 performs data normalization for input data 705, such as the well log in depth. One or more operations are performed for data preparation at 710. These operations can include sequences 715 with length dz in depth are extracted with a stride defined by a user. Networks 720 perform operations including a first network predicting an output TWT length for each sequence and a second network converting the input sequence to the output sequence with length. Different sequences in TW, shown as 725 are realigned, shown as 730, one with the other by estimating an optimal time-lag from one sequence to the next one.

FIG. 8 is a graphical representation of experimental results 800 for a test well and provides a comparison of the expected and predicted TWT sonic for the test well. Results 800 are shown including a prediction of a process described herein on a real well, shown as 802. The results are shown compared to an expectation based on existing VSP data, shown as 801, with well log stretched by using the integrated well log sonic. The trained model predicts sequence bits, which are aligned together to form an estimated average sonic in TWT, shown as 802 and prediction uncertainty bounds represented by 803. In this example, the estimation matched very well the expected sonic log in TWT as predicted by using the Vertical Seismic Profiling conversion law. For reference result 804 represents using the integrated sonic log for transformation, which has large errors. In FIG. 8, the average prediction closely follows the expected trace with no time delay. The only places with more significant mismatch between the two curves is where sonic varies rapidly, just above the reference marker. The prediction standard deviation is also highest in this position. In other places, prediction standard deviation remains low. Therefore, the prediction of this particular test performs well in the shallow part of the well.

Figure 9:
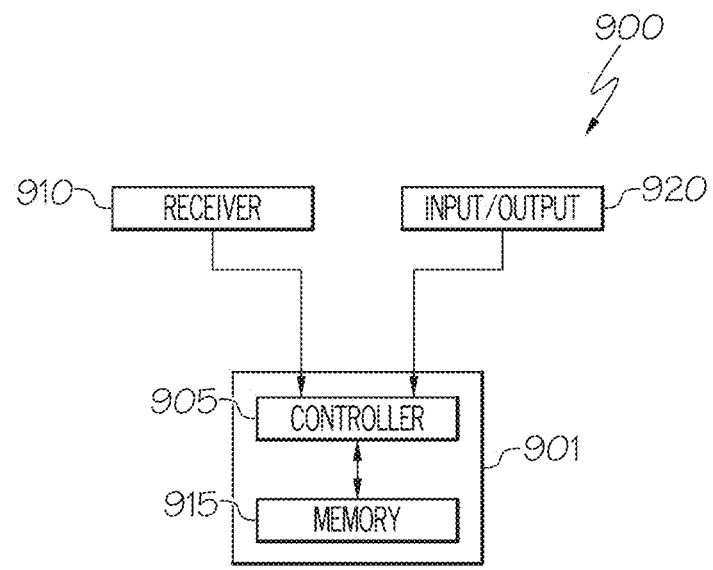
FIG. 9 illustrates a system for characterization of a reservoir formation.

FIG. 9 illustrates a system for characterization of a reservoir formation. System 900 includes components or operational elements of a device according to embodiments described herein. According to one embodiment, system 900 may be configured for domain conversion and reservoir characterization. System 900 may include a collection of components that may be integrated into a device and/or relate to a collection of devices. System 900 includes device 901 which be configured to convert seismic well tie conversions. According to one or more embodiments, device 901 includes controller 905 and memory 915. Device 901 may be coupled to receiver 910 and input/output module 920. Receiver 910 may be configured to receive sequences in depth. According to one or more embodiments, controller 905, which may relate to a processor or control device, is configured to execute one or more operations stored in memory 915, such as processes for domain conversion and/or neural networks including process 200 of FIG. 2 and process 1000 of FIG. 10. Controller 905 may be a well tie processor. Controller 905 may be coupled to I/O 920 and receiver 910. Controller 905 may be configured to control operations based on one or more inputs from I/O block 920. Device 901 may output corrected data by way of I/O block 920.

Figure 10:
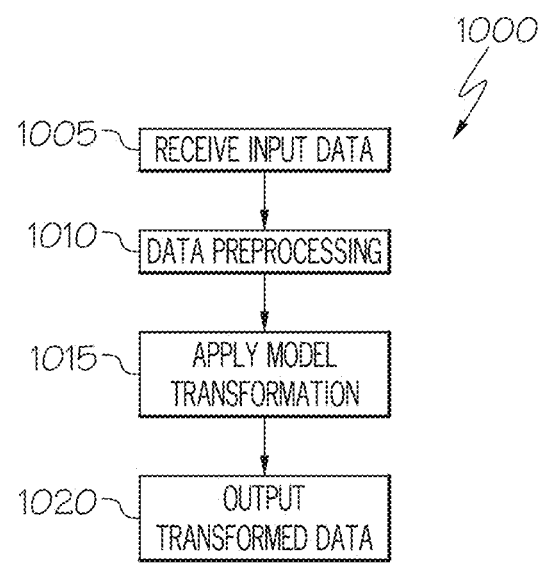
FIG. 10 illustrates a process for seismic well tie domain conversion.

FIG. 10 illustrates an example process 1000 for seismic well tie domain conversion of data. Process 1000 may be performed to convert seismic data to characterize reservoir formations or reservoir region 100. By way of example, process 100 may be configured to transform seismic input, such as sonic longs, from a depth domain to a time domain using a model. As such, process 100 may use a model described herein and one or more operations discussed for processing input data. According to embodiments, process 1000 may be performed by device including a processor as discussed with reference to FIG. 9.

Process 1000 may be initiated by receiving input data at block 1005. Input data received at block 1005 can include data for a field region, such as data 206 in the depth domain and data 207 in time domain (e.g., TWT data). Data received at block 1005 may also include at least one seismic wave trace (e.g., sonic trace) in a depth domain and at least one time-depth curve. Data received at block 1005 may also include extracted data for available wells with CS/VSP data. According to some embodiments, data received at block 1005 can include at least one of (1) available time-depth curves derived from CS/VSP data; (2) well logs with at least a compressional sonic log (DTC) in depth with associated well trajectories (X, Y, Z); and (3) the X, Y and Depth coordinates of a regional marker from well data. The input data received at block 205 may be used to train a neural network (e.g., deep learning network) and generate at least one model for domain conversion of data.

Data preprocessing at block 1010 may include preprocessing of the data received at block 1005 to prepare the data for conversion relative to a depth domain and time domain. According to embodiments, preprocessing at block 1010 may include determining a length of output sequence for received input data. Block 1010 may include one or more operations described with reference to FIG. 3, data preprocessing in FIG. 6A, and data preparation in FIG. 7. At block 1015 a model may be applied to input data for transformation of the input data from transforming, using the one or more processors, input data in the depth domain to a time domain using a model. The model at block 1015 may be a neural network configured to determine a length of an output in a time domain for well data received in a depth domain. For example, the model may be trained to predict the length of an output sequence. According to embodiments, the model may be is trained to convert a sequence of sonic log data in a depth domain to a sequence in a time domain using the neural network.

At block 1020, transformed data may be output. Output of transformed data at block 1010 may include converting an input sequence of a well to an output sequence with a defined length. Transforming can also include realigning sequences in two-way-time by estimating a time-lag relative to the sequences and resampling the sequences following realignment to a common grid for output as a set of values in two-way-time.

It should now be understood that embodiments of the present disclosure are directed to systems and methods for domain conversion of data for a field region, such as seismic to well data or well tie domain processing in general. Embodiments can use at least one neural network to generate models for conversion of well log data. The systems and processes described herein can preprocess data for use. Embodiments are provided for using and training deep neural networks to convert sonic log data automatically from a depth domain to the time domain. The stretch-and-squeeze prediction is accurate even when attenuation causes varying sonic drift. As a result, a network as described herein can be used on a field basis to integrate well sonic and VSP for velocity model building. Embodiments including neural networks as used herein may be used to reach prediction accuracy in a fraction of the time compared to conventional processes.

Systems and methods are also provided for characterization or reservoir regions and reservoir formations including methods that include performing data normalization for input data, such as the well log in depth. The method also includes operations for data preparation, predicting an output TWT length for each sequence, and converting an input sequence to the output sequence with a defined length. The method also includes realigning different sequences in the TWT domain by estimating an optimal time-lag from one sequence to the next. The method includes output for any given TWT value.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

The invention claimed is:

1. A system for seismic well tie domain conversion, the system comprising:
   one or more processors; and a non-transitory computer-readable memory storing instructions that, when executed by the one or more processors, causes the one or more processors to:

receive input data for a field region, the input data including depth domain data and time domain data for at least one well in the field region;

preprocess the input data to generate training data for the field region;

train a well tie model to determine a length of an output sequence using the training data, wherein the well tie model is a neural network configured to determine a length of an output in a time domain for well data received in a depth domain, and wherein training the well tie model to determine the length of the output sequence includes selecting at least one hyper-parameter, generating a vector of output sequences in a time domain for a batch of data and modifying weights of the well tie model using a back-propagation algorithm to reduce error relative to expected output for the batch of data, wherein training further includes reducing a value of a validation loss function by performing a Bayesian hyper-parameter optimization;

train the well tie model to convert well data using the neural network, wherein the model is trained to convert a sequence of sonic log data in a depth domain to a sequence in a time domain;

transform input data in the depth domain to the time domain using the well tie model, wherein transforming is performed using the well tie model and determined length of output sequence; and output the transformed data.

2. The system of claim 1, wherein the input data includes at least one seismic wave trace in a depth domain and at least one time-depth curve.

3. The system of claim 1, wherein the one or more processors preprocess the input data by performing a data and quality control estimation to validate well data for the field region, characterizing the well data for at least one of training, validation and testing, performing one or more operations for normalizing the well data, performing one or more operations for segmentation of the well data, and performing one or more operations for forming batches of data in the depth domain.

4. The system of claim 1, wherein the one or more processors train the well tie model to determine an output length sequence includes selection of at least one hyper-parameter, generating a vector of output sequences in a time domain for a batch of data and modifying weights of the well tie model using a back-propagation algorithm to reduce error relative to expected output for the batch of data.

5. The system of claim 1, wherein the one or more processors train the well tie model to convert well data includes training for conversion of sonic log data in a depth sequence to a two way time sequence using at least one of a Long-Short Term Memory (LSTM) neural network and a temporal convolutional network (TCN).

6. The system of claim 1, wherein the one or more processors transform input data to generates an estimate of a sonic trace in two-way-time.

7. The system of claim 1, wherein the one or more processors transform input data using a time-depth curve and a sonic drift determined from the input data for the field region.

8. The system of claim 1, wherein the one or more processors transform input data by converting an input sequence of a well to an output sequence with a defined length.

9. The system of claim 8, wherein the one or more processors are further configured to realign sequences in two-way-time by estimating a time-lag relative to the sequences and resampling the sequences following realignment to a common grid for output as a set of values in two-way-time.

10. A method for seismic well tie domain conversion, the method comprising:

receiving, by one or more well tie processors, input data for a field region, the input data including depth domain data and time domain data for at least one well in the field region;

preprocessing, using the one or more well tie processors, the input data to generate training data for the field region;

training, using the one or more well tie processors, a well tie model to determine a length of an output sequence using the training data, wherein the well tie model is a neural network configured to determine a length of an output in a time domain for well data received in a depth domain;

training, using the one or more well tie processors, the well tie model to convert well data using the neural network, wherein the well tie model is trained to convert a sequence of sonic log data in a depth domain to a sequence in a time domain, and wherein training the well tie model to convert well data includes training for conversion of sonic log data in a depth sequence to a two way time sequence using at least one of a Long-Short Term Memory (LSTM) neural network and a temporal convolutional network (TCN), wherein training further includes reducing a value of a validation loss function by performing a Bayesian hyper-parameter optimization;

transforming, using the one or more well tie processors, input data in the depth domain to the time domain using the well tie model, wherein transforming is performed using the well tie model and determined length of output sequence; and outputting, using the one or more well tie processors, the transformed data.

11. The method of claim 10, wherein the input data includes at least one seismic wave trace in a depth domain and at least one time-depth curve.

12. The method of claim 10, wherein the preprocessing comprises performing a data and quality control estimation to validate well data for the field region, characterizing the well data for at least one of training, validation and testing, performing one or more operations for normalizing the well data, performing one or more operations for segmentation of the well data, and performing one or more operations for forming batches of data in the depth domain.

13. The method of claim 10, wherein training the well tie model to determine an output length sequence includes selection of at least one hyper-parameter, generating a vector of output sequences in a time domain for a batch of data and modifying weights of the well tie model using a back-propagation algorithm to reduce error relative to expected output for the batch of data.

14. The method of claim 10, wherein training the well tie model to convert well data includes training for conversion of sonic log data in a depth sequence to a two way time sequence using at least one of a Long-Short Term Memory (LSTM) neural network and a temporal convolutional network (TCN).

15. The method of claim 10, wherein the transformation generates an estimate of a sonic trace in two-way-time.

16. The method of claim 10, wherein the transformation uses a time-depth curve and a sonic drift determined from the input data for the field region.

17. The method of claim 10, wherein the transformation includes converting an input sequence of a well to an output sequence with a defined length.

18. The method of claim 17, further comprising realigning sequences in two-way-time by estimating a time-lag relative to the sequences and resampling the sequences following realignment to a common grid for output as a set of values in two-way-time.

19. A method for seismic well tie domain conversion, the method comprising:
receiving, by one or more well tie processors, input data for a well in a field region, the input data including a sonic trace for the well as depth domain data;
preprocessing, using one or more well tie processors, the input data to determine a length of output sequence;
training, using the one or more well tie processors, a well tie model to determine a length of an output sequence using training data, wherein the well tie model is a neural network configured to determine a length of an output in a time domain for well data received in a depth domain, and wherein training the well tie model to determine the length of the output sequence includes selecting at least one hyper-parameter, generating a vector of output sequences in a time domain for a batch of data and modifying weights of the well tie model using a back-propagation algorithm to reduce error relative to expected output for the batch of data, wherein training further includes reducing a value of a validation loss function by performing a Bayesian hyper-parameter optimization;
transforming, using the one or more well tie processors, input data in the depth domain to a time domain using a well tie model,
wherein the well tie model is a neural network configured to determine a length of an output in a time domain for well data received in a depth domain, and wherein the well tie model is trained to convert a sequence of sonic log data in a depth domain to a sequence in a time domain using the neural network; and
outputting, using the one or more well tie processors, the transformed data.

20. The method of claim 19, wherein transforming includes converting an input sequence of a well to an output sequence with a defined length, and wherein transforming also includes realigning sequences in two-way-time by estimating a time-lag relative to the sequences and resampling the sequences following realignment to a common grid for output as a set of values in two-way-time.

* * * * *